United States Patent [19]

Cartmell

[11] 4,394,349

[45] Jul. 19, 1983

[54] APPARATUS FOR THE FLUIDIZED CATALYTIC CRACKING OF HYDROCARBON FEEDSTOCK

[75] Inventor: Robert R. Cartmell, Crown Point, Ind.

[73] Assignee: Standard Oil Company (Indiana), Chicago, Ill.

[21] Appl. No.: 280,901

[22] Filed: Jul. 6, 1981

[51] Int. Cl.³ .................... F27B 15/08; C10G 35/14; C10G 47/30

[52] U.S. Cl. .................... 422/147; 208/153; 208/161; 422/144; 422/145; 431/170

[58] Field of Search ............... 422/147, 142, 144, 145; 431/7, 170; 208/153, 161

[56] References Cited

U.S. PATENT DOCUMENTS

| | | | |
|---|---|---|---|
| 3,898,050 | 8/1975 | Strother | 422/144 |
| 4,289,729 | 9/1981 | Myers et al. | 422/144 |
| 4,295,961 | 10/1981 | Fahrig et al. | 208/161 |
| 4,310,489 | 1/1982 | Fahrig et al. | 422/145 X |
| 4,313,910 | 2/1982 | Dries et al. | 422/147 |

Primary Examiner—Barry S. Richman
Attorney, Agent, or Firm—Lansing M. Hinrichs; William T. McClain; William H. Magidson

[57] ABSTRACT

An apparatus for the fluidized catalytic cracking of a hydrocarbon feedstock comprises a riser reactor and a collar positioned along the same axis as the downstream end of the riser reactor. The collar is further positioned in close proximity to, but not in contact with, the riser reactor such that an annular space is defined between the riser reactor and the collar. The collar has a diameter greater than the diameter of the riser reactor at its downstream end and communicates directly and laterally with the inlets of the cyclone separation system. The riser reactor may or may not include a flow reversal cap to redirect the flow of the hydrocarbons and the catalyst.

6 Claims, 8 Drawing Figures

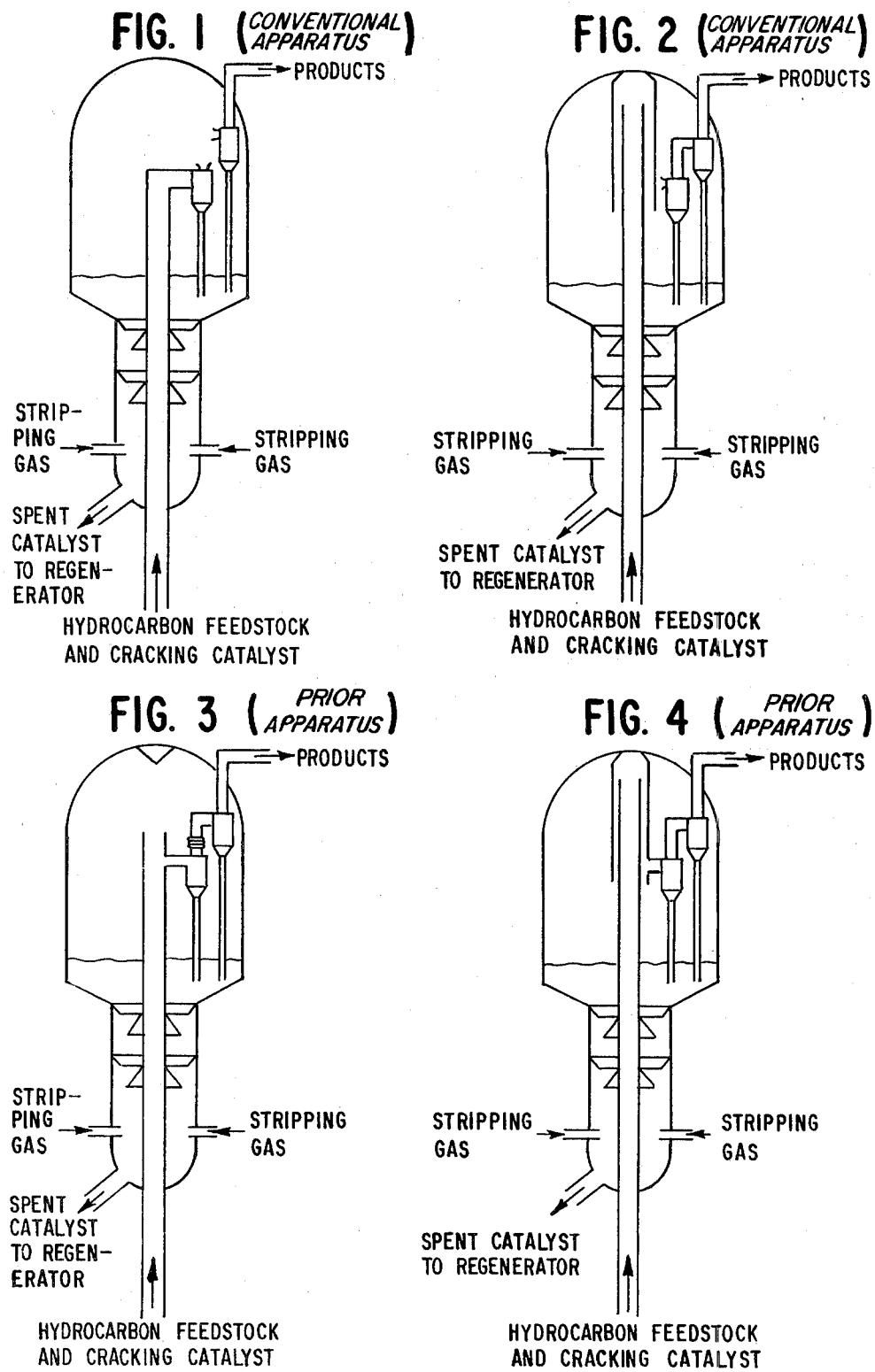

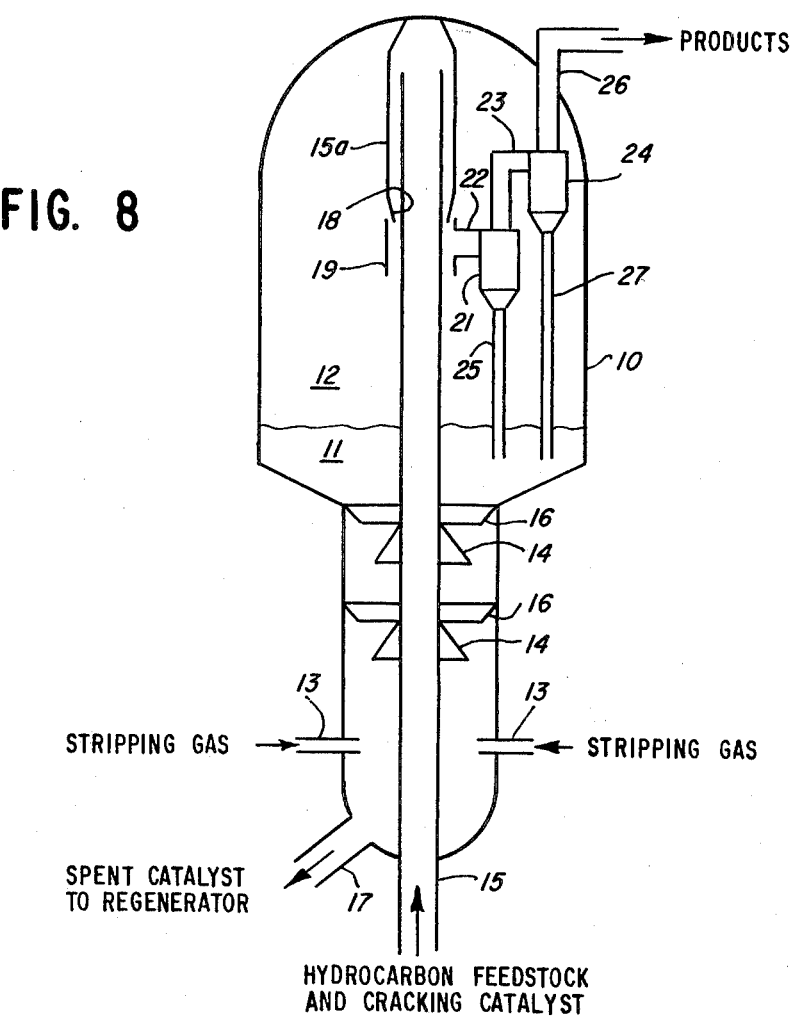
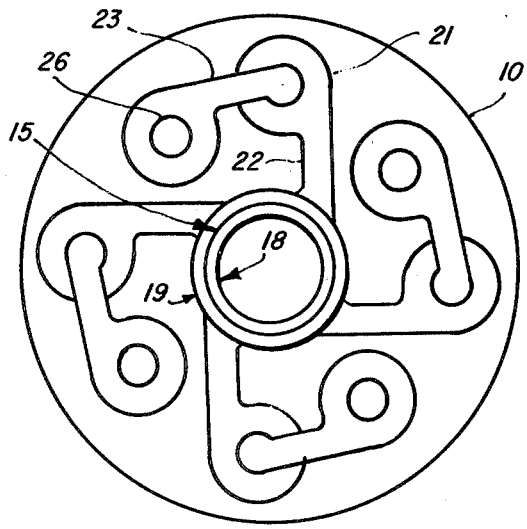

APPARATUS FOR THE FLUIDIZED CATALYTIC CRACKING OF HYDROCARBON FEEDSTOCK

FIELD OF THE INVENTION

This invention relates to the fluidized catalytic cracking of hydrocarbon feedstocks. More particularly, it relates to an improved apparatus for effecting the catalytic cracking process.

BACKGROUND OF THE INVENTION

It is well known that hydrocarbon feedtstocks containing higher molecular weight hydrocarbons can be converted into lighter weight hydrocarbons such as gasoline by the process of catalytic cracking. In modern fluid catalytic cracking units, the cracking reaction is effected by introducing the hydrocarbon feedstock at the lower, or upstream, end of a riser reactor pipe together with hot fluidized catalyst. The hot catalyst supplies all or a major proportion of the heat to vaporize the feedstock and to carry out the endothermic cracking reaction.

The vaporized feedstock and catalyst pass up the riser reactor together at high velocity. Because of the high activity of the catalyst, the cracking reaction has generally proceeded to the desired extent at the upper, or downstream, end of the riser reactor. The cracked hydrocarbons are then separated from the catalyst in a disengaging vessel and are sent downstream for further processing and/or storage. The catalyst is, in turn, stripped with an inert gas such as steam to remove entrained hydrocarbons before being sent to a regenerating zone for removal of the coke which built up on the catalyst during the cracking process. The regenerated cracking catalyst is then reintroduced into the riser reactor.

As mentioned above, modern fluid catalytic cracking units are designed so that the desired degree of catalytic cracking is attained at the downstream end of the riser reactor. If the cracking reaction proceeds beyond this point, overcracking occurs and undesirable, lighter weight products are formed. To avoid overcracking, it is very important to rapidly and completely separate the hydrocarbons from the catalyst. Furthermore, since thermal cracking proceeds even without the presence of catalyst, it is important to rapidly remove the hydrocarbons from the elevated temperatures within the disengaging vessel.

Many different designs for fluidized catalytic cracking units have been employed in an effort to achieve rapid and complete separation of the hydrocarbons from the catalyst and also to achieve rapid removal of the hydrocarbon products from the disengaging vessel. One such design is shown in FIG. 1. In FIG. 1, the riser reactor feeds directly into first-stage cyclone separators located within the disengaging vessel. For convenience, the riser reactor is shown feeding into only one first-stage cyclone; in practice there are several. The cracked hydrocarbon vapors exit out the top of the cyclones and pass to second-stage cyclone separators (again, only one is shown for convenience), while the catalyst exits out the bottom via standpipes, or dip legs, into the catalyst bed, or dense phase.

Upon exiting the second-stage cyclones, the hydrocarbons are sent downstream (as shown) for further processing and/or storage, or, alternately, they are sent to third-stage cyclones. Since the entire amount of catalyst flowing in the riser reactor enters the first-stage cyclones in this design, the cyclones are heavily lined with refractory to withstand the erosion caused by the catalyst. These cyclones are also designed with large diameter dip legs to accommodate the heavy catalyst loading.

In the fluid catalytic cracking unit shown in FIG. 1, overcracking is not a serious problem during steady-state conditions. However, catalyst surges are inevitable during the operation of a fluid catalytic cracking unit and overcracking does become a problem when such surges occur.

During steady-state conditions, the separation of the hydrocarbons from the catalyst occurs very quickly in the first-stage cyclones so catalytic overcracking is minimized. Furthermore, little catalyst is present in the dilute phase and this, too, helps minimize catalytic overcracking. A moderate amount of thermal overcracking occurs during steady-state conditions because all of the hydrocarbons have some residence time in the dilute phase as they pass from the first-stage cyclones to the second-stage cyclones before being removed from the disengaging vessel.

In contrast, catalyst surges cause serious problems of overcracking in the FIG. 1 unit. When a catalyst surge enters the first-stage cyclones, separation efficiency is greatly reduced and excessive amounts of hydrocarbons flow down the dip legs while excessive amounts of catalyst spew out the top of the cyclones into the dilute phase. The result is that hydrocarbon-catalyst contacting is increased in both the dense phase and in the dilute phase and the undesirable, lighter weight hydrocarbon products are formed.

Another fluid catalytic cracking unit is shown in FIG. 2. In FIG. 2, the riser reactor includes a flow reversal cap which directs the hydrocarbons and the catalyst downward into the dilute phase of the disengaging vessel and towards the dense phase. The hydrocarbons later change direction and flow into the cyclone separation system. As in FIG. 1, only one first-stage cyclone and only one second-stage cyclone are shown for convenience.

The FIG. 2 unit features a low catalyst loading on the cyclone system since only a small percentage of the catalyst is carried up from the dense phase by the hydrocarbons and stripping gas. Thus, erosion inside the cyclones is reduced and relatively small-diameter dip legs can be employed.

During steady-state conditions, a moderate amount of catalytic overcracking occurs since the hydrocarbons and the catalyst remain in contact in the dilute phase. Thermal overcracking occurs as well in the dilute phase during steady-state conditions. When a catalyst surge occurs, the amount of overcracking increases since even more catalyst enters the dilute phase.

Thus, there exists a strong need in the petroleum refining industry for a fluid catalytic cracking unit which features low catalyst loading on the cyclone system and which also keeps overcracking to a minimum, during both steady-state conditions and during catalyst surges. Within the past few years, two new designs have been suggested to eliminate these problems. As will be seen, both designs reduce the above-mentioned problems, but create new problems of their own.

FIG. 3 is a simplified drawing of a fluid catalytic cracking unit disclosed in Myers, U.S. Pat. No. 4,070,159, which is hereby incorporated by reference.

In the Myers design, the cyclones are directly and laterally connected to the upper extremity of the riser reactor, the top of which is open into the disengaging vessel. The upward flowing catalyst is carried by inertial momentum into the dilute phase while the hydrocarbon vapors pass laterally into the cyclones. At the top of the vessel, the catalyst hits a conical deflector plate which directs it radially to the sides of the vessel. The catalyst finally drops by gravity to the dense phase at the bottom of the vessel.

The Myers apparatus avoids heavy catalyst loading to the cyclones because only a small percentage of the catalyst enters the cyclones. The design also reduces overcracking because most of the hydrocarbons are rapidly and effectively separated from the catalyst at the top of the riser reactor and in the first-stage cyclones, during both steady-state conditions and during surges. However, some overcracking still occurs because a small percentage of the hydrocarbons are carried into the dilute phase where both catalytic and thermal overcracking occurs. In fact, these hydrocarbons are likely to be seriously overcracked since their only route of exiting the dilute phase is by passing against the flow of material leaving the riser reactor.

The most serious problem associated with the Myers design is that of differential thermal expansion between the riser reactor and the cyclone system which occurs predominantly during start-ups and shutdowns. This differential can cause twisting of the hardware which can, in turn, result in the breaking of welds, the loosening of refractory lining, etc. To minimize the adverse effects of differential thermal expansion, the Myers apparatus contains an expansion joint, shown in FIG. 3 between the first-stage and second-stage cyclones. In such an application, expansion joints are unsatisfactory in several respects. For example, they are prone to fatigue failure from the lateral and longitudinal movement, catalyst erosion can wear through the metal since the joints cannot be refractory lined, and coke deposits can build up in the joints and can prevent movement.

FIG. 4 is a simplified drawing of the apparatus disclosed in Fahrig et al., U.S. patent application Ser. No. 096,939, filed Nov. 23, 1979, now U.S. Pat. No. 4,295,961 issued Oct. 20, 1981, which is hereby incorporated by reference. The Fahrig design features cyclones which are directly and laterally connected to the flow reversal cap of the riser reactor. By directing the hydrocarbon-catalyst mixture downward before separation, this design augments inertial momentum with gravitational momentum to ensure that an even more rapid and effective separation is made at the cyclone inlet. However, as with the Myers design, overcracking can be a problem since hydrocarbons which enter the dilute phase must exit by passing against the flow of material leaving the riser reactor.

The Fahrig apparatus is also an advance over the Myers apparatus because the problem of differential thermal expansion between the riser reactor and the cyclone system is reduced and the need for an expansion joint is eliminated. This reduction occurs because, in Fahrig, the cyclones are directly connected to the cap portion of the riser reactor rather than to the riser portion. It can be seen that the temperature differential between the cyclones and the cap will be less than the differential between the cyclones and the riser.

Therefore, a need still exists for a fluid catalytic cracking unit which offers the following four features:

(1) low catalyst loading on the cyclone system;

(2) rapid and effective separation of the hydrocarbons from the catalyst, during both steady-state conditions and during catalyst surges;

(3) rapid removal of the hydrocarbons from the elevated temperatures within the disengaging vessel; and (4) elimination of the problem of differential thermal expansion between the riser reactor and the cyclone system.

SUMMARY OF THE INVENTION

The general object of this invention is to provide an improved apparatus for effecting the fluid catalytic cracking process. The specific object is to provide an apparatus containing the following features:

(1) low catalyst loading on the cyclone system so that erosion is reduced and so that the size of the dip legs can be minimized;

(2) rapid and effective separation of the hydrocarbons from the catalyst, during both steady-state conditions and during catalyst surges, in order to minimize catalytic overcracking;

(3) rapid removal of the hydrocarbons from the elevated temperatures within the disengaging vessel in order to minimize thermal overcracking; and (4) elimination of the problem of differential thermal expansion between the riser reactor and the cyclone system.

I have discovered that these objects can be attained in an apparatus comprising a disengaging vessel, a vertically ascending riser reactor, a collar, and a cyclone separation system. The disengaging vessel has a dense catalyst phase and a dilute catalyst phase. The vertically ascending riser reactor has means at its upstream end for the introduction of the hydrocarbon feedstock and the cracking catalyst and has a downstream end communicating with the interior of the vessel. The riser reactor may or may not include a flow reversal cap to redirect the flow of the hydrocarbons and the catalyst. If the riser reactor does include a flow reversal cap, the cap is positioned at the downstream end of, and in overlapping coaxial relationship with, the remainder of the riser reactor.

The collar is positioned along the same axis as the downstream end of the riser reactor. The collar is also positioned in close proximity to, but not in contact with, the riser reactor such that an annular space is defined between it and the riser reactor. The collar has a diameter greater than the diameter of the riser reactor at its downstream end. The cyclone separation system is located within the disengaging vessel. It has an outlet communicating with the interior of the vessel to discharge catalyst into the dense phase, an outlet connected to vent the cracked hydrocarbons outside the vessel, and an inlet directly and laterally communicating with the collar.

Low catalyst loading on the cyclone system is achieved by directly and laterally connecting the cyclone inlets to the collar since the high-momentum catalyst tends to continue in its direction of flow rather than to pass laterally into the cyclone system.

Rapid and effective separation of the hydrocarbons from the catalyst is achieved because most of the hydrocarbons pass laterally into the cyclone system while, as mentioned above, the heavier catalyst tends to continue in its direction of flow and pass into the dilute phase.

By passing into the cyclone system, most of the hydrocarbons are rapidly removed from the elevated temperatures within the disengaging vessel. The small percentage of hydrocarbons which do enter the dilute phase are aspirated back into the collar interior through the annular space defined between the riser reactor and the collar. These hydrocarbons then make a second pass past the inlets to the cyclone system and can thus pass laterally into the system and out of the disengaging vessel.

The problem of differential thermal expansion between the riser reactor and the cyclone system is totally eliminated because the two are unconnected. It follows, of course, that the need for an expansion joint is eliminated as well. The point of separation is the annular space defined between the riser reactor and the collar.

BRIEF DESCRIPTION OF THE DRAWINGS

FIGS. 1 and 2 are elevational views of conventional fluid catalytic cracking units.

FIG. 3 is an elevational view of the fluid catalytic cracking unit disclosed in Myers, U.S. Pat. No. 4,070,159.

FIG. 4 is an elevational view of the fluid catalytic cracking unit disclosed in Fahrig et al., U.S. patent application Ser. No. 096,939.

FIGS. 6 and 7 are sectional views of FIG. 5. These two views show alternate arrangements of the cyclone separation system about the riser reactor.

FIG. 8 is an elevational view of a fluid catalytic cracking unit incorporating another embodiment of this invention.

DETAILED DESCRIPTION OF THE INVENTION

This invention is an improved apparatus for effecting the fluidized catalytic cracking of hydrocarbon feedstocks. The term "hydrocarbon feedstocks" is intended to include, but not to be limited to, petroleum fractions such as residual oils and gas oils, shale oils, oils from tar sands, oils from coal liquefaction, and the like. Suitable hydrocarbon cracking catalysts include high-activity solids having a size not greater than about 100 microns. Preferably, the major proportion of the cracking catalyst is in the size range of about 40 to 80 microns. Suitable catalysts include those of the amorphous silica-alumina type as well as the zeolitic type.

Figure 5:
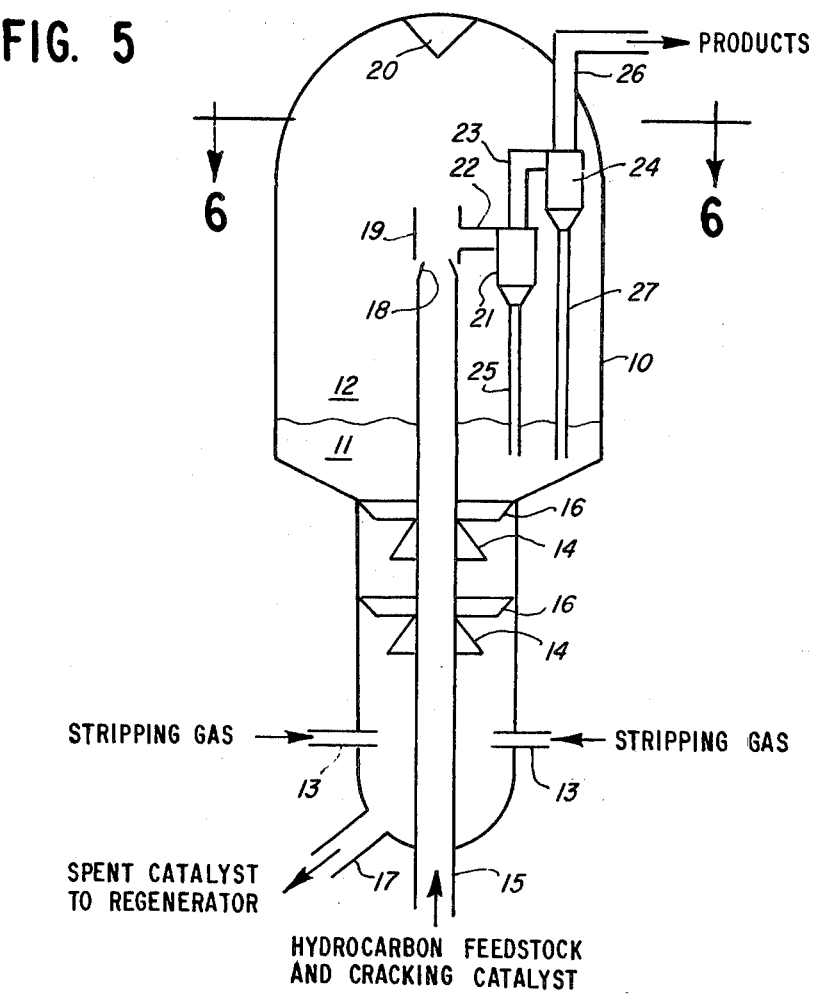
FIG. 5 is an elevational view of a fluid catalytic cracking unit incorporating an embodiment of this invention.

This invention can best be understood by reference to the drawings. FIG. 5 illustrates one embodiment of this invention. The disengaging vessel 10 contains a dense catalyst phase 11 having a density of about 30 to 45 lbs./ft.$^3$ and a dilute catalyst phase 12 having a density less than about 2 lbs./ft.$^3$. The lower portion of the vessel contains a conduit 13 for the introduction of an inert stripping gas, such as steam, into the vessel. Accordingly, the lower portion of the vessel is commonly called the "stripper." The stripper portion includes a plurality of frustoconical baffles 14 attached to the riser reactor 15 and interspersed frustoconical baffles 16 attached to the side wall of the vessel. The lower portion of the vessel also contains a conduit 17 for transferring spent catalyst to the regenerator (not shown).

The vertically ascending riser reactor has means (not shown) at its upstream end for the introduction of the hydrocarbon feedstock and the cracking catalyst. The riser reactor extends into the disengaging vessel with its downstream end 18 communicating with the interior of the vessel. The downstream end is preferably tapered inwardly, as shown in FIG. 5.

The collar 19 is positioned along the same axis as the downstream end of the riser reactor. The collar is positioned in close proximity to, but not in contact with, the riser reactor such that an annular space is defined between the riser reactor and the collar. The diameter of the collar is greater than the diameter of the riser reactor at its downstream end so that all of the hydrocarbon-catalyst mixture flowing in the riser reactor passes into the collar interior rather than out through the annular space into the dilute phase. To further ensure this flow pattern, it is preferred that the collar have at least some overlap with the riser reactor.

The collar is generally constructed of the same material used in the riser reactor. The collar can, however, be constructed of a lighter gauge if so desired. Like the riser reactor, the collar is lined with refractory material to withstand the erosion effect of the flowing catalyst.

For a fluid catalyst cracking unit designed to process 50,000 barrels of gas oil per day, the following dimensions are typical. The disengaging vessel has an overall height of about 80 feet, the upper portion having a height of about 45 feet and the lower portion having a height of about 35 feet. The diameter of the upper portion is about 20 feet and the diameter of the lower portion is about 10 feet.

The riser reactor has a total height of about 100 feet and a dimater of about 4.5 feet. This diameter gives a hydrocarbon average transport velocity of about 30 to 60 ft./sec. The average transport velocity of the catalyst is approximately one-half of the hydrocarbon velocity. The downstream portion of the riser reactor is tapered inwardly at an angle of about 5 degrees for 2 feet. The collar has a diameter of about 5 feet and a height of about 7 feet. It overlaps the riser reactor for about 1 foot at operating temperatures and thus defines an annular space with a width of about 1.5 inches.

Returning to FIG. 5, a conical deflector plate 20 is mounted to the top of the disengaging vessel directly above the riser reactor. The plate is designed to direct the flow of catalyst radially to the sides of the vessel.

A first-stage cyclone separator 21 directly and laterally communicates with the collar via the first-stage inlet 22. The cyclone separator can take the form of any configuration which is useful for separating solids from gases. The first-stage gas outlet 23 is connected to the second-stage cyclone separator 24. The first-stage dip leg 25 extends downward into the dense phase.

The second-stage gas outlet 26 is shown extending through the top of the disengaging vessel. The outlet is connected to some type of product recovery system (not shown). Alternately, the second-stage gas outlet could be connected to a third-stage cyclone separator. The second-stage dip leg 27 extends downward into the dense phase. Although not shown, the cycle system would generally be supported by rods or bars attached to the top of the disengaging vessel.

Figure 6:
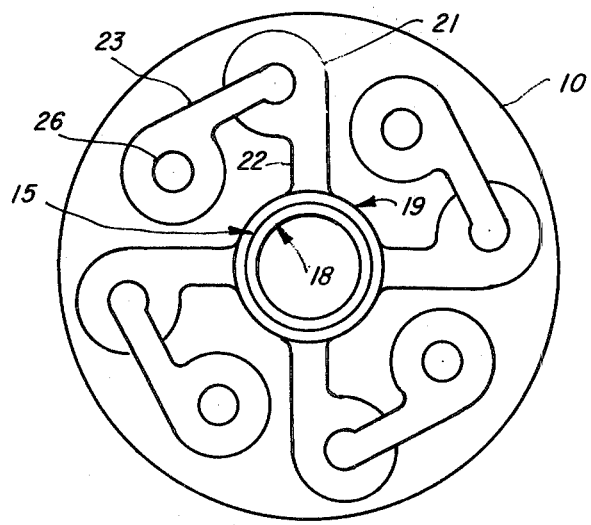

In FIG. 5, only one first-stage and only one second-stage cyclone separators are shown for convenience. However, the preferred arrangement comprises a plurality of cyclone separators positioned symmetrically around the riser reactor. One such preferred arrangement is shown in FIG. 6 where four first-stage cyclone separators are positioned radially about the riser reactor. An alternate preferred arrangement is shown in FIG. 7 where four first-stage cyclone separators are positioned tangentially about the riser reactor.

This novel design offers very significant advantages over previous designs. First of all, the catalyst loading on the cyclone system is relatively low. Therefore, erosion of the cyclone system is reduced and the size of the dip legs can be minimized. This relatively low loading occurs because the catalyst is carried by inertial momentum into the dilute phase of the disengaging vessel rather than passing laterally into the first-stage inlets. The loading is further reduced if the downstream end of the riser reactor is tapered inwardly. This taper directs the catalyst away from the cyclone inlets and also reduces the cross-sectional area of the riser reactor so that the velocity and momentum of the flowing catalyst is increased.

Secondly, with this novel design a very rapid and effective separation occurs between the hydrocarbons and the catalyst during both steady-state conditions and during catalyst surges. Therefore, catalytic overcracking is minimized. This separation occurs because the heavier catalyst particles are carried by inertial momentum into the dilute phase while the lighter hydrocarbon vapors pass laterally into the cyclone system. What catalyst does enter the cyclone system is soon separated from the hydrocarbons and returned to the dense phase via the dip legs.

Thirdly, the cracked hydrocarbons are rapidly removed from the elevated temperatures within the disengaging vessel in order to minimize thermal overcracking. As mentioned above, most of the hydrocarbons pass laterally into the cyclone system and are removed without ever entering the dilute phase. With this novel design, the small percentage of hydrocarbons which do inevitably enter the dilute phase are aspirated through the annular space between the riser reactor and the collar and then pass laterally into the cyclone system and out of the vessel.

And finally, the problem of differential thermal expansion between the riser reactor and the cyclone system is totally eliminated because the two are unconnected.

FIG. 8 illustrates a second embodiment of this invention. In this embodiment, the riser reactor 15 includes a flow reversal cap 15a which is preferably tapered inwardly at the downstream end. The flow reversal cap, which redirects the flow of the cracked hydrocarbons and the catalyst, is positioned at the downstream end of, and in overlapping coaxial relationship with, the remainder of the riser reactor. It is preferred that the flow reversal cap be of a diameter such that the cross-sectional area of the annular space between the cap and the remainder of the riser reactor is approximately equal to the cross-sectional area of the non-tapered portion of the remainder of the riser reactor. This sizing of the cap ensures that the linear velocity of the hydrocarbons in the annular space is substantially the same as in the remainder of the riser reactor.

As shown in FIG. 8, the collar 19 is positioned as before to define the annular space between it and the riser reactor. As can be seen by comparing FIG. 8 with FIG. 5, the other features of this second embodiment are the same as in the first.

I claim:

1. An apparatus for the fluidized catalytic cracking of a hydrocarbon feedstock, the apparatus comprising:
   (a) a disengaging vessel having a dense catalyst phase and a dilute catalyst phase;
   (b) a vertically ascending riser reactor having means at its upstream end for the introduction of the feedstock and the catalyst, the riser reactor further having a downstream end communicating with the interior of the vessel;
   (c) a collar having two open ends in communication with the interior of said disengaging vessel and positioned along the same axis as the downstream end of the riser reactor, the collar further being positioned in close proximity to, but not in contact with, the riser reactor such that an annular space is defined between the riser reactor and the collar, the collar having a diameter greater than the diameter of the riser reactor at its downstream end; and
   (d) a cyclone separation system located within the vessel and having:
      (i) an outlet communicating with the interior of the vessel to discharge catalyst into the dense phase;
      (ii) an outlet connected to vent the cracked hydrocarbons outside the vessel; and
      (iii) an inlet directly and laterally communicating with the collar;
   whereby vapors from the vessel may enter the annular space defined by the collar through one open end thereof and may thereafter enter the cyclone separation system through said inlet.

2. The apparatus of claim 1 wherein the downstream end of the riser reactor is tapered inwardly.

3. The apparatus of claim 1 wherein the collar overlaps the riser reactor.

4. An apparatus for the fluidized catalytic cracking of a hydrocarbon feedstock, the apparatus comprising:
   (a) a disengaging vessel having a dense catalyst phase and a dilute catalyst phase;
   (b) a vertically ascending riser reactor having means at its upstream end for the introduction of the feedstock and the catalyst, the riser reactor further having a downstream end communicating with the interior of the vessel;
   (c) a collar positioned along the same axis as the downstream end of the riser reactor, the collar further being positioned in close proximity to the riser reactor such that an annular space open at both ends into the vessel is defined between the riser reactor and the collar, the collar having a diameter greater than the diameter of the riser reactor at its downstream end; and
   (d) a cyclone separation system located within the vessel and having:
      (i) an outlet communicating with the interior of the vessel to discharge catalyst into the dense phase;
      (ii) an outlet connected to vent the cracked hydrocarbons outside the vessel; and
      (iii) an inlet directly and laterally communicating with the collar;
   and said collar being rigidly connected to said cyclone separation system, but not being in contact with said riser reactor, whereby differential thermal expansion between the riser reactor can occur without adverse effect.

5. An apparatus for the fluidized catalytic cracking of a hydrocarbon feedstock, the apparatus comprising:
   (a) a disengaging vessel having a dense catalyst phase and a dilute catalyst phase;
   (b) a vertically ascending riser reactor having means at its upstream end for the introduction of the feedstock and the catalyst, having a downstream end communicating with the interior of the vessel, and including a flow reversal cap to redirect the flow of the hydrocarbons and the catalyst, the flow reversal cap being positioned at the downstream end of the riser reactor and in overlapping coaxial relationship therewith;

(c) a collar having two open ends in communication with the interior of said disengaging vessel and positioned along the same axis as the downstream end of the riser reactor, the collar further being positioned in close proximity to, but not in contact with, the riser reactor such that an annular space is defined between the riser reactor and the collar, the collar having a diameter greater than the diameter of the riser reactor at its downstream end; and (d) a cyclone separation system located within the vessel and having:
 (i) an outlet communicating with the interior of the vessel to discharge catalyst into the dense phase;
 (ii) an outlet connected to vent the cracked hydrocarbons outside the vessel; and
 (iii) an inlet directly and laterally communicating with the collar.

6. The apparatus of claim 5 wherein the cross-sectional area of the annular space between the flow reversal cap and the remainder of the riser reactor is approximately equal to the cross-sectional area of the remainder of the riser reactor.

* * * * *